United States Patent [19]

Filips et al.

[11] Patent Number: 4,665,574

[45] Date of Patent: May 19, 1987

[54] MATTRESS

[76] Inventors: Chester P. Filips, 16401 SW. 142nd Ave., Lot 49, Miami, Fla. 33177; Antonio G. Blanco, 927 SW. 118th Ct., Miami, Fla. 33184

[21] Appl. No.: 780,816

[22] Filed: Sep. 27, 1985

[51] Int. Cl.[4] .................. A47C 27/00; G03B 42/02

[52] U.S. Cl. .................. 5/462; 5/67; 5/481; 378/177

[58] Field of Search .................. 5/423, 449–458, 5/461, 462, 468, 469, 473, 503, 66, 67, 446, 464; 378/167, 177, 182

[56] References Cited

U.S. PATENT DOCUMENTS

| | | | |
|---|---|---|---|
| 1,949,035 | 2/1934 | Beurschgens | 5/473 |
| 3,233,101 | 2/1966 | Forsyth | 378/167 |
| 3,503,082 | 3/1970 | Kerwit | 5/67 |
| 3,551,923 | 1/1971 | Franklin | 5/462 |
| 3,631,242 | 12/1971 | Williams | 378/209 |
| 3,648,305 | 3/1972 | Ersek | 5/82 |
| 3,724,004 | 4/1973 | Behrens | 5/68 |
| 3,771,781 | 11/1973 | Lackey et al. | 378/167 |
| 3,818,516 | 6/1974 | Hopper et al. | 5/67 |
| 3,826,922 | 7/1974 | Ingles | 378/167 |
| 3,967,126 | 6/1976 | Otto, Jr. | 378/177 |
| 3,968,374 | 7/1976 | Schroeder | 378/167 |
| 3,986,034 | 10/1976 | Wittkopp et al. | 378/167 |
| 4,103,170 | 7/1978 | Spradlin | 378/179 |
| 4,205,233 | 5/1980 | Craig et al. | 378/209 |
| 4,416,020 | 11/1983 | Wagner et al. | 378/181 |

FOREIGN PATENT DOCUMENTS

| | | | |
|---|---|---|---|
| 3242639 | 5/1984 | Fed. Rep. of Germany | 378/182 |
| 173050 | 12/1921 | United Kingdom | 5/503 |

*Primary Examiner*—John E. Murtagh
*Assistant Examiner*—Andrew Joseph Rudy
*Attorney, Agent, or Firm*—Burns, Doane, Swecker & Mathis

[57] ABSTRACT

A hospital mattress assembly includes a radiolucent assembly that permits radiographic examination of a patient without disturbing or moving the patient any significant amount. The radiolucent assembly has a window disposed symmetrically between the sides of the mattress and is located under the torso of a patient. The radiolucent assembly provides enhanced spinal support for the patient while also providing an inexpensive apparatus for conducting radiographic examination of critical patients.

9 Claims, 4 Drawing Figures

MATTRESS

BACKGROUND OF THE INVENTION

The present invention relates generally to mattresses suitable for use in hospital environments. More particularly, the present invention concerns a mattress for use in care of critical patients which provides both a means for permitting radiographic studies to be performed with minimal patient movement and an improved support for the patient's torso.

When a hospital patient has undergone surgery affecting the upper torso, including surgery on the back and spinal column itself, radiographic examination during the recovery period is often necessary. In some situations, it is necessary to move portable X-ray equipment to the critical patient's bedside because the patient's condition prevents him from being transferred to the hospital's X-ray department. However, even when such portable X-ray equipment is used, it is necessary to move and disturb the patient in order to place the unexposed film in the proper position for radiographic exposure.

Repeated movements, and jostling of the patient during portable radiography can be not only uncomfortable for the patient but in many situations are a potential source of risk to continued recovery by the patient. For example, where a patient has recently emerged from serious surgery, for example open heart surgery, there are often a plethora of drainage tubes, intravenous connections, and intraarterial connections. Disruption of these various tubes and connections can damage them, require their replacement, and can even injure the patient if they are inadvertently dislodged.

In addition, there are times when the apparatus surrounding the patient requires the assisting personnel to move the patient while those personnel are in awkward positions. Attempting to lift or move a patient who may not be able to assist can lead to physical strains on those personnel that may result in claims under workman's compensation and the like. Touching the patient to lift or move him also creates problems where the patient is in isolation to control the spread of an infectious disease. Under these circumstances, the need to lift a patient exposes the attending personnel to the infection and increases the risk that the infection can be spread to other areas of the institution. And, where the radiographic material directly contacts the patient, the radiographic material itself provides a mechanism for spreading the disease or infection.

In the past, it has frequently been necessary to also provide critical patients with supplemental back supports while those patients convalesce. Typical situations where such supplemental supports are required are where the patient has undergone surgery affecting the upper torso including surgery on the back and spinal column itself. There are numerous other circumstances where additional support is required such as where there is an injury to the back itself.

To provide this additional support, prior approaches have been to insert a wide, flat board beneath the mattress and on top of the bed frame.

There are also circumstances where the patient cannot physically lie on a hard, flat apparatus such as a radiographic cassette. Similarly, there are times when the sensitivity of the patient's skin is such that he cannot tolerate the temperature difference between his body and the radiographic cassette. Accordingly, prior techniques of radiography have been inadequate to overcome all of these problems.

Naturally, efforts have been made in the past to overcome some of the foregoing types of problems. For example, specially designed beds are known which permit unexposed film to be positioned for the X-ray examination of a patient without moving the patient. See for example, U.S. Pat. No. 4,103,170 issued to Spradlin, and U.S. Pat. No. 3,724,004 issued to Behrens. However, where the proposed solution to the problem is a structural modification of a hospital bed, the cost to the institution becomes significant since hospital beds are quite expensive. Some devices have also been proposed which aid fluroscopic examinations of patients. See, for example, U.S. Pat. No. 3,818,516 issued to Hopper et al, U.S. Pat. No. 3,631,242 issued to Williams, and U.S. Pat. No. 3,503,082 issued to Kerwit. Devices for use with fluroscopy do not, however, utilize a film to produce a radiograph.

Efforts have also been made to improve the method for handling the unexposed film during preparation for radiographic examination of patients. See, for example, U.S. Pat. No. 4,205,233 issued to Craig et al and U.S. Pat. No. 3,967,126 issued to Otto, Jr. However, these devices are not suited for use with hospital beds and mattresses.

Certainly, there is a clear need to minimize to the extent possible the capital expenses that hospitals and other institutions which care for the ill must incur. Moreover, there is a need to reduce the risk of inadvertent injury to the patient by the health care staff and the related liability of the health care staff. Furthermore, there is a need to reduce the potential of injury to hospital personnel from movement of the patient and the potential for claims against workmen's compensation.

Accordingly, it will be seen that the need continues to exist for inexpensive devices which can be used by hospital staffs to improve the patient's comfort while still permitting the necessary radiographic examinations to be performed.

OBJECTS AND SUMMARY OF THE INVENTION

It is a general object of the present invention to provide a suitable device for use in hospitals and institutions which care for the sick and the infirm which will permit the radiographic examination of patients without the risk of further injury.

It is another object of the present invention to provide a suitable mattress for use in hospitals and the like which not only permits radiographic examination but which also gives improved support for the patient's torso during periods of bed rest.

A further object of the present invention is to provide an inexpensive means of permitting the radiographic examination of critical patients at the patient's room without significant movement of the patient and without transferring the patient to a remote X-ray department.

The foregoing objects are achieved by providing a hospital mattress with a lateral opening which receives a generally flat radiolucent assembly which, in turn, has a slot to receive unexposed radiographic film. Preferably the radiolucent assembly is located in the portion of the mattress normally supporting the torso of the patient.

With such an arrangement, the radiolucent assembly provides an enhanced firmness to the mattress for patient support. Moreover, the mattress has a slot into which unexposed radiographic film can be placed in order to conduct an examination of the patient. By properly orienting a portable X-ray device, for example, examination can be conducted with minimal movement, if any, of the patient himself. Thus the risks to the patient are avoided, as is the risk of potential liability from inadvertent patient injuries. Furthermore, the simple use of a mattress with the proper modifications minimizes the capital expense that the institution must incur to effect the desired advantages.

The ability of attending personnel to properly position the unexposed radiographic film can be improved by arranging the film in a film cassette and by providing a tray which can be slidably received in the slot of the radiolucent assembly. The tray, for example, may be provided with an adjustable means for holding the film cassette so that the position of the film cassette in the radiolucent assembly can be fixed during the period of radiographic exposure.

To provide a reduction in the radiation generated by the examination, it may also be desirable to fabricate the radiolucent assembly from metal with the exception of a radiolucent window on the side facing the patient. With such an arrangement, the radiation used to expose the film is retarded from escape into the environment. Alternatively, there may be situations where it will be desirable to fabricate the radiolucent assembly entirely from a suitable plastic material.

The radiolucent assembly is preferably positioned between the top and bottom surfaces of the mattress so that there is sufficient padding between the patient and the radiolucent assembly to maintain the patient's comfort. In some applications, it will be desirable to place the radiolucent assembly closer to the bottom surface than to the top surface of the mattress to provide even greater padding beneath the patient.

Another feature of the invention deals with the use of radiolucent material in the mattress itself in the region between the radiolucent assembly and the patient. With this construction a clear image of the patient area being radiographically examined results.

BRIEF DESCRIPTION OF THE DRAWINGS

The above as well as many other objects and advantages of the present invention will be apparent to those skilled in the art when this disclosure is read in conjunction with the appended drawings wherein like reference numerals have been applied to like elements and wherein.

DESCRIPTION OF THE PREFERRED EMBODIMENT

Figure 1:
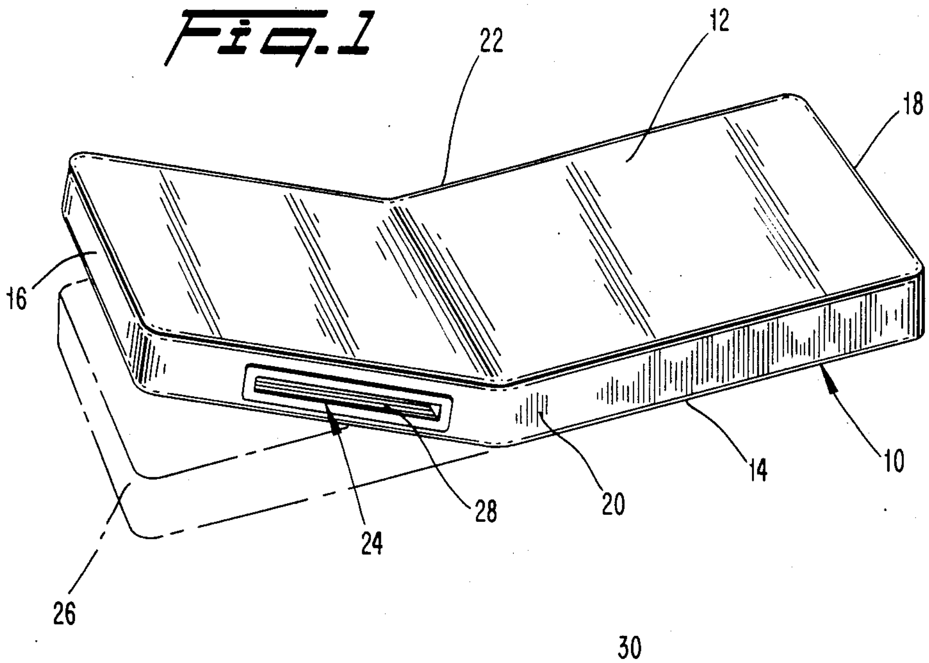
FIG. 1 is a perspective view of a hospital mattress according to the present invention.

Turning now to FIG. 1, a mattress 10 is illustrated. The mattress 10 has a patient supporting surface 12 positioned on the top and has an underlying or bottom surface 14 which is adapted to be supported by a suitable conventional adjustable hospital bed (not shown). The patient supporting surface 12 and the bottom surface 14 are generally planar and are generally parallel to one another.

The entire surface of the mattress 10 is preferably provided with a covering 15. This covering 15 is waterproof and protects the other parts of the mattress. Similar suitable conventional coverings are found on standard hospital mattresses currently available.

The mattress 10 has a first end 16 that is ordinarily positioned at the head of the patient and a second end 18 which is ordinarily positioned at the foot of the patient. The first end 16 of the mattress 10 is normally in the position shown in broken lines 26. However, when the mattress 10 is placed on a conventional hospital bed, various portions of the mattress 10 can be articulated relative to other portions of the mattress 10. Accordingly, the first end 16 can be elevated to the position shown in solid lines in FIG. 1.

In addition, the mattress 10 has a first side 20 and a second side 22. The first side 20 of the mattress 10 has an opening which receives and contains a radiolucent assembly 24. The radiolucent assembly 24 has a generally planar slot 28 which opens to the first side 20 of the mattress 10 so as to provide access thereto. The radiolucent assembly 24 is spaced from the first end 16 of the mattress 10 by a distance which is approximately the same as the distance from the top of a head to the shoulder area of a typical person. With this relationship, the radiolucent assembly 24 is positioned in the mattress so that it is in general vertical alignment with the torso of a patient that may repose upon the mattress 10. Preferably, the radiolucent assembly 24 extends along the mattress 10 by a distance which is approximately coextensive with the length of an average patient's torso. As a result, the radiolucent assembly 24 is longitudinally positioned in the mattress 10 so that radiographic examination of the torso can be conducted without moving the patient or disturbing the patient in any significant way. Since minimal movement, at most, is required, the mattress permits the radiographic examination to take place with sharply reduced disruption of the patient in comparison to previously known practices.

Figure 2:
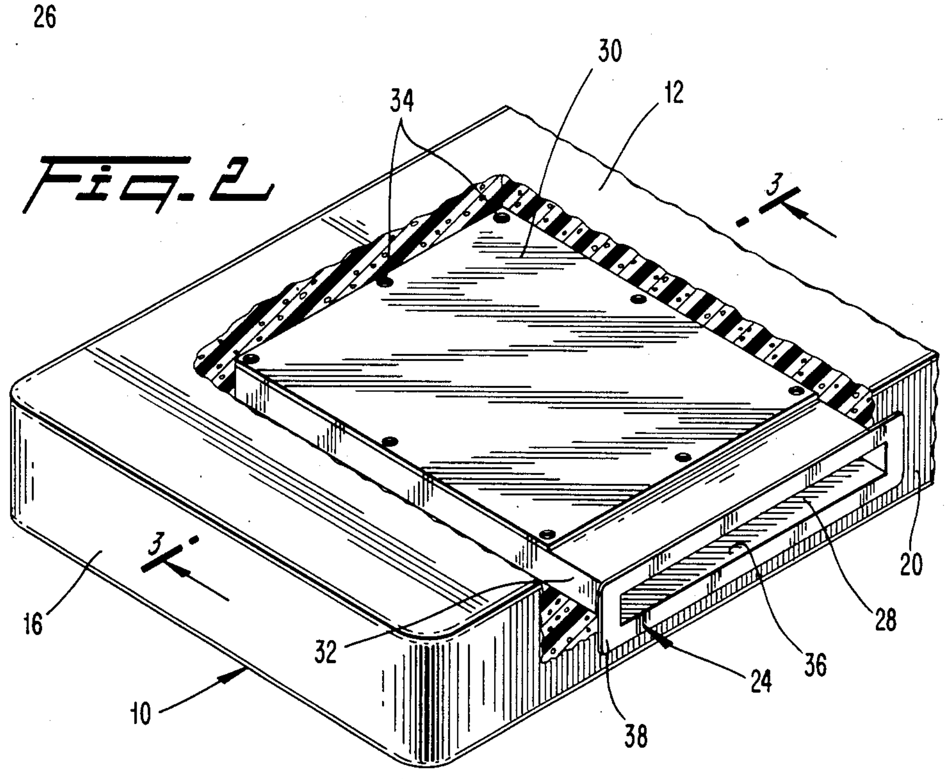
FIG. 2 is an enlarged perspective view of an end of the mattress in FIG. 1 with a radiographic film tray partially opened and with portions of the mattress and radiolucent assembly removed to illustrate details of the radiolucent assembly as well as details of a radiographic film tray.

The radiolucent assembly 24 may be fashioned from either a suitable plastic material or from metal. Where the radiolucent assembly 24 is fashioned from metal or from a radio-opaque material, a radiolucent panel 30 may be provided at the top of the assembly (see FIG. 2). The radiolucent panel 30 may be fabricated from a suitable material that is translucent to the type of radiation to be employed in the examination. For example, materials such as "Lucite", "Plexiglas", and other acrylic materials are suitable for this purpose where X-rays are to be used for the examination. Thus, the radiolucent panel 30 permits the examination radiation to pass unimpeded to the unexposed film positioned in the slot 28 of the radiolucent assembly 24.

To facilitate placement and positioning of the radiographic film in the radiolucent assembly 24, a film tray 31 may be provided. The tray 31 is preferably slidably received in the slot 28 of the radiolucent assembly 24. In addition, the height of the tray 31 is preferably selected to be slightly less than the height of the slot 28 and the width of the tray 31 is selected to be slightly less than the width of the slot 28. With this arrangement, the tray 31 will slide in the slot 28 without binding but will be closely guided by the slot so that the tray 31 does not tilt downwardly when it is pulled from the radiolucent assembly 24.

The tray 31 may include a longitudinal slot 33 and a pair of cassette holders 39. With one or both of the cassette holders 39 being mounted in the longitudinal slot 33, the cassette holders 39 can be positioned longitudinally in the tray 31 at the desired location. When the radiographic film is contained in a film cassette 37, the film cassette 37 can be adjusted laterally with respect to the tray 31 and can be held in the desired position by the cassette holders 39. A suitable handle 41 can also be provided on the edge of the tray 31 to aid withdrawal of the tray 31 from the slot 28.

The mattress 10 can be fashioned from any suitable material. However, the portion of the mattress 10 located above the radiolucent panel 30 must also be radiolucent. Suitable materials for the mattress include foam rubber. If desired the entire mattress can be fabricated from the same material. But, it is also possible to use an inner spring construction for parts of the mattress not in vertical alignment with the radiolucent panel 30.

The radiolucent assembly 24 and the radiolucent panel 30 are sized to be slightly larger than the normal size of unexposed film used in the examination of torso regions. Moreover, the radiolucent panel 30 when needed is preferably secured along its periphery to the body 32 of the radiolucent assembly 24 by suitable conventional threaded fasteners 34. By making the radiolucent panel 30 slightly larger than the size of the film to be exposed, a mounting edge 43 can be provided on top of the body 32 to which the radiolucent panel 30 can be attached. This simplifies the construction of the radiolucent assembly 24.

The body 32 of the radiolucent assembly 24 has a generally planar top 34 which is essentially parallel to a generally planar bottom 36. When the body 32 is fabricated from a radio-opaque material like a metal such as stainless steel, a window in the top 34 allows examination radiation to pass through the radiolucent panel 30 to film contained in the slot 28. Moreover, by making the body 32 from a material such as stainless steel which is opaque to the examination radiation, the body 32 itself acts to shield the environment from spurious radiation emitted during the examination procedure. It is noted that where the tray 31 is fashioned from a radio-opaque material, the tray also will act to shield the environment for spurious radiation.

Surrounding the slot 28 at the first side 20 of the mattress 10 is a flange 38. This flange 38 is attached to the body 32 in a suitable conventional manner so as to be essentially integral therewith. In addition, the flange 38 may be provided with rounded corners to minimize the presence of sharp corners on which a patient or attending staff might injure themselves. Preferably the flange 38 is flush to the first side 20 of the mattress 10. This flange 39 helps staff locate the slot 28 and helps the staff to place the unexposed film on the tray 41 in the slot 28 without being impaled on an exterior edge of the radiolucent assembly 24. Thus, the flange 38 also helps extend the useful life of the mattress assembly. If desired, one of the longer edges of the flange can be provided with a scale to aid staff in positioning film in the slot 28 or on the tray 31. Such a scale could be particularly useful where the film being used is smaller than the available planar extent of the radiolucent panel 30.

Figure 3:
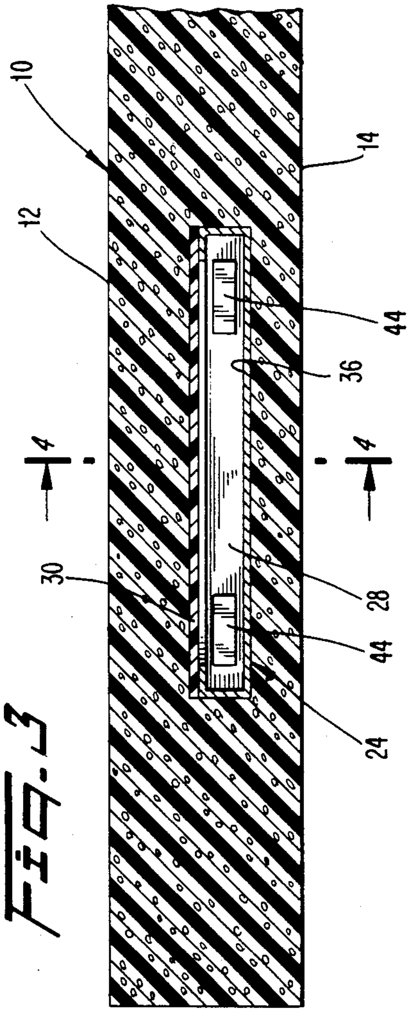
FIG. 3 is a partial cross-sectional view taken along the line 3—3 of FIG. 2 with the film tray removed for clarity.

As best seen in FIG. 3, the radiolucent assembly 24 is positioned between the patient supporting surface 12 and the bottom surface 14 of the mattress 10. With this arrangement, the radiolucent assembly 24 is also effective to provide significant support to the firmness of the mattress 10. Such firmness is desirable where the patient's injury dictates enhanced support as well as when the patient must receive certain forms of emergency treatment such as CPR. The radiolucent assembly 24 may be spaced from the patient supporting surface 12 of the mattress 10 by a distance which is greater than the distance from the radiolucent assembly 24 to the bottom surface 14 of the mattress 10. With such an arrangement, the relative spacing clearly indicates to the staff which side of the mattress 10 is the patient supporting surface 12. Since in the preferred embodiment only one side of the radiolucent assembly 24 is radiolucent, the proper orientation of the mattress 10 on the hospital bed is important.

In some situations, it may also be desirable to center the radiolucent assembly vertically between the upper and lower surfaces of the mattress so as to be essentially equidistant therebetween. Such an arrangement would allow both mattress surfaces to be used for patient support. Of course, the slot 28 in the radiolucent assembly 24 would then be positioned on either side of the hospital bed. Moreover, the radiolucent assembly 24 would require a radiolucent panel on both its top and bottom or would be necessarily fashioned entirely from radiolucent material.

Figure 4:
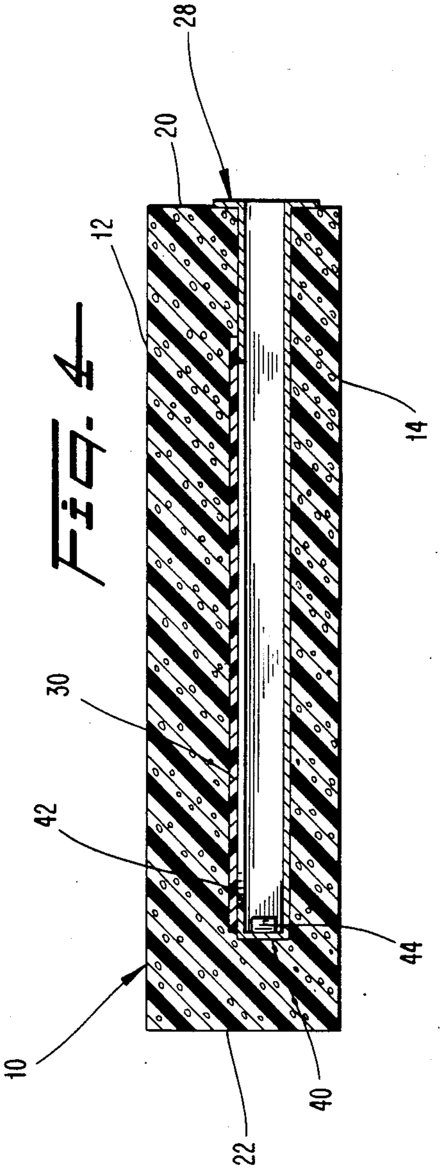
FIG. 4 is a partial cross-sectional view taken along the line 4—4 of FIG. 3 with the film tray removed for clarity.

The radiolucent assembly 24 does not extend completely through the mattress 10 as can best be seen from FIG. 4. In fact, the radiolucent assembly 24 has a closed end 40 which protrudes just beyond the window 42 covered by the radiolucent panel 30. The window 42 and the associated radiolucent panel 30 are positioned to be approximately symmetrically located relative to the first side 20 and the second side 22 of the mattress 10. During typical radiographic examination, the patient would be located in the central part of the mattress 10 so such an arrangement for the window 42 and the radiolucent panel 30 provides the most useful organization for the structure.

It will also be noted that the closed end 40 of the radiolucent assembly 24 also includes a pair of resilient blocks 44. These blocks 44 protrude from the end 40 and cushion the contact of the tray 31 and the closed end of the radiolucent assembly when the tray slides into the slot 28.

The cross-sectional proportions of the slot 36 are selected to accommodate the tray 31 which, in turn, accommodates the proportions of suitable conventional holders or cassettes of unexposed radiographic film. Accordingly, the prepared film need only be placed in the slot 36, given an appropriate exposure, removed and developed.

In use, the mattress assembly of the present invention is simply placed on the top of a suitable conventional hospital bed frame. The mattress can be articulated along with movement of the bed just the same as a conventional mattress. When it becomes necessary to conduct, for example, an X-ray examination of a patient in the bed, a portable X-ray machine is simply moved into position above the patient. An X-ray cassette containing an unexposed X-ray film is then placed in the tray 31 which is then slid into the slot 28 (see FIG. 2). Once the film is exposed, it is removed and developed.

From the foregoing, it will be clear that it was not necessary to move the patient in any significant way. There is no risk to a critical patient through movement of the patient to place an X-ray film cassette directly beneath the patient as is now done. Moreover, there is a significantly reduced risk that the patient is accidentally injured through the dislocation of any intravenous or intraarterial connections or thoracic tubes.

It will also be clear that the portable radiography could be accomplished without touching the patient which can be significant where the patient is in isolation. Accordingly, the mattress of the present invention has significant utility in hospital intensive care units, critical care units, isolation wards, burn wards, and any other place where patient movement, patient contact, or both must be reduced to a minimum.

Various particular advantages of the present invention will also be apparent at this point. For example, the comfort of the patient is significantly increased since it is no longer necessary to move the patient or to touch the patient in order to acquire the radiographic examination. A related advantage is that there is a reduction in the pain a patient must experience since movement of seriously ill patients is frequently accompanied by pain.

Another advantage is the decreased likelihood of cross contamination of other patients and hospital personnel and improved control of infections and infectious diseases. This advantage is accomplished since there is no need for hospital personnel to touch the patient so as to lift him in order to position the radiographic film and later remove it.

Since the patient need not be lifted, there is a further advantage in that there is a reduced change that healing fractures or wounds will be reinjured.

The additional firmness of the mattress under the patient's torso has the additional advantage of providing increased support for the patient's torso which is particularly desirable for post-operative recovery of open-heart surgery patients and spinal cord surgery patients.

Since the patient need not be lifted, there is a reduced risk of injury or physical strain to the X-ray technologist or other assisting hospital personnel. Moreover, there is less need for the assistance for other hospital personnel since the physical assistance is reduced. As a result, those other personnel are available to care for other patients and to tend to their normal duties without interruption.

There are also situations where the mattress of the present invention will provide an improved radiographic image. For example, there are times when a patient cannot lie on a hard flat radiographic cassette. Moreover, there are times when the relatively cool temperature of the radiographic cassette in contact with the body is intolerable to the patient. Thus, in these situations the mattress of the present invention provides further and additional advantages not heretofore available.

It should now be apparent that a new hospital bed assembly has been provided in accordance with this disclosure which overcomes the problems noted and which provides numerous advantages over other known devices. Moreover, it will be apparent to those skilled in the art that numerous modifications, substitutions, and equivalents exist for various features of the invention. Accordingly, it is expressly intended that all such modifications, variations, substitutions, and equivalents which fall within the spirit and scope of the invention as defined in the appended claims be embraced thereby.

What is claimed is:

1. A hospital mattress which permits X-ray examination of a patient without moving the patient to another horizontal support surface while improving firmness of support for a typical patient having a torso, shoulders, and a head comprising:
- a mattress having a length and a width conforming to those of a standard articulatable hospital bed,
- including an end, at least one side, a patient supporting surface, and a bottom surface,
- being fashioned from a compressible synthetic material,
- being flexible with the articulatable bed, and
- including an opening in the side, the opening being positioned between the patient support surface and the bottom surface, spaced from the end by a distance greater than the distance between the patient's head and shoulders, and having a length less than the width of the mattress;
- film support means in the opening for permitting placement of unexposed X-ray film and for augmenting torso support, the film support means having a slot which opens to the side of the mattress, a radiolucent surface adjacent to the patient supporting surface, and a radioopaque surface spaced below the radiolucent surface, the radiolucent surface being spaced from the patient supporting surface by a distance at least one half of the thickness of the mattress between the patient supporting surface and the bottom surface;
- means for positioning unexposed X-ray film, positioned in the film support means, adjustable longitudinally and laterally of the mattress; and
- compressible radiolucent material between the patient supporting surface and the radiolucent surface.

2. The hospital mattress of claim 1 wherein the means for positioning film includes a tray having a length and a width, selected to accommodate conventional sizes of X-ray film cassettes.

3. The hospital mattress of claim 1 wherein the means for positioning film has a length and width, selected to accommodate conventional sizes of X-ray film.

4. The hospital mattress of claim 1 wherein the radiolucent surface is fashioned from a plastic-like acrylic material which exhibits strength as well as radiolucency.

5. The hospital mattress of claim 1 wherein the film support means is fashioned from sheet metal except for the radiolucent surface.

6. The hospital mattress of claim 1 wherein the film support means is substantially equidistant from the top and bottom mattress surfaces so that either the top or the bottom mattress surface can be used as a patient supporting surface.

7. The hospital mattress of claim 1 wherein the film support means includes: a generally planar body with a bottom parallel to the radiolucent surface, the body defines the slot, a flange surrounds the entrance to the slot to avoid sharp edges, and the radiolucent surface covers only a fraction of the top surface, the radiolucent surface being spaced from the flange so as to be symmetrically positioned between the sides of the mattress.

8. The hospital mattress of claim 7 wherein the means for positioning film includes a tray which is slidably received in the slot of the generally planar body, the tray including means for positioning an X-ray film cassette.

9. The hospital mattress of claim 1 wherein the film support means is spaced from the patient supporting surface by a distance greater than the distance between the film support means and the bottom surface to provide increased resilient support between the patient supporting surface and the film support means.

* * * * *